Sept. 3, 1929.  J. C. REED  1,727,131
SYSTEM FOR LOAD CONTROL
Filed Dec. 16, 1926  2 Sheets-Sheet 1
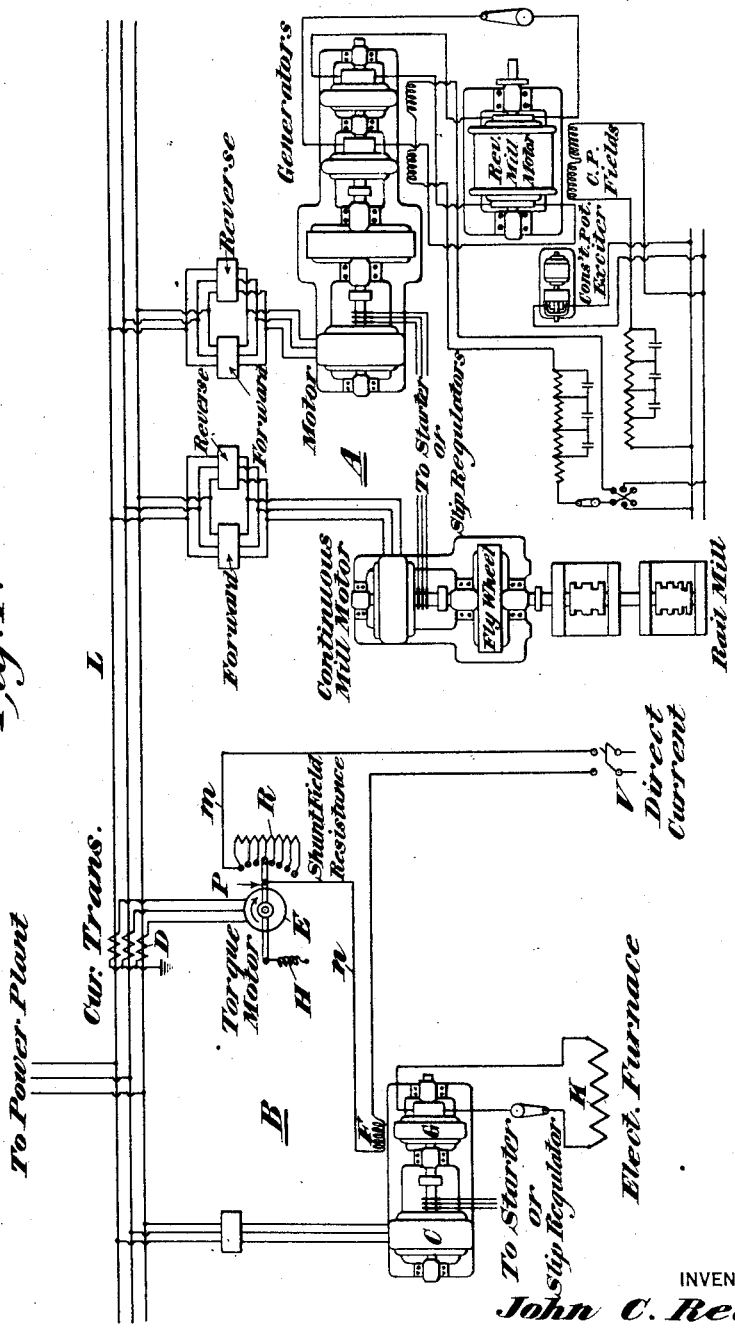
INVENTOR
John C. Reed.
BY
R. S. C. Dougherty.
ATTORNEY

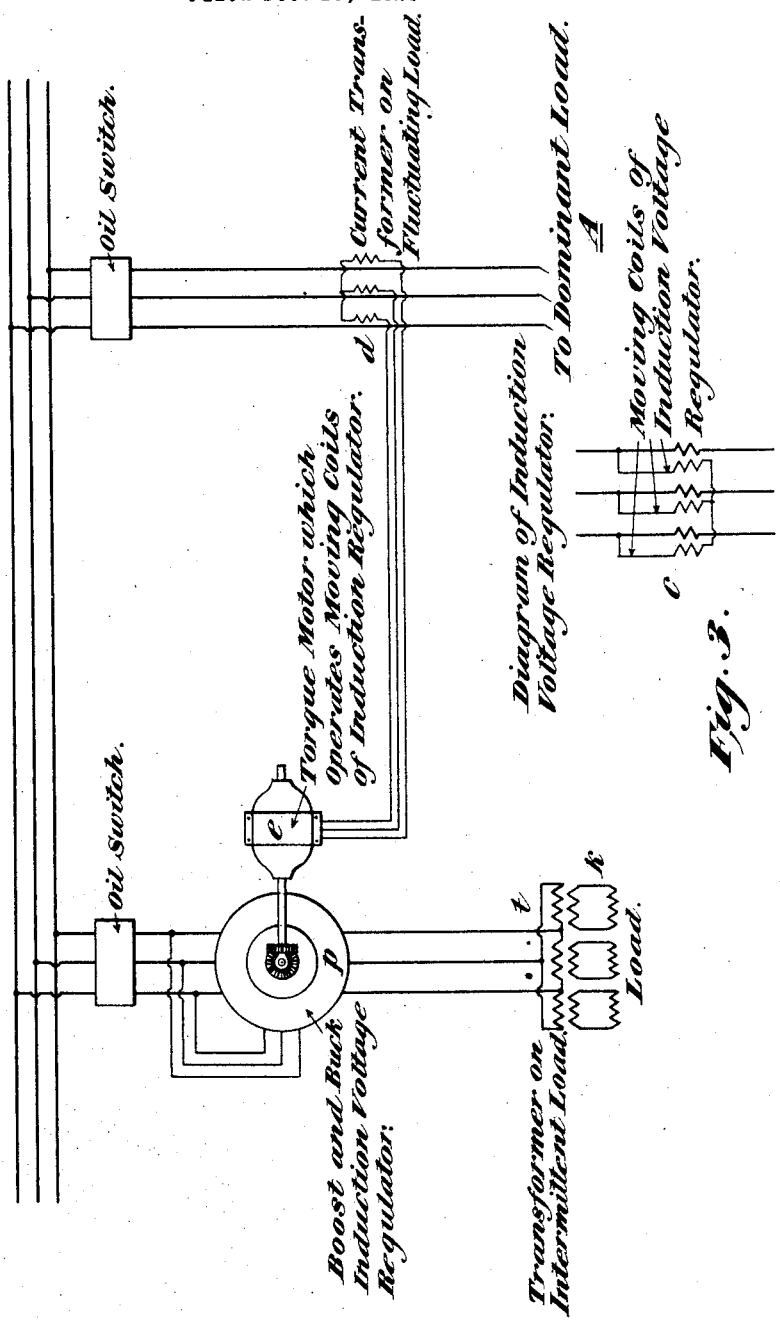

Patented Sept. 3, 1929.

1,727,131

UNITED STATES PATENT OFFICE.

JOHN C. REED, OF STEELTON, PENNSYLVANIA, ASSIGNOR TO BETHLEHEM STEEL COMPANY.

SYSTEM FOR LOAD CONTROL.

Application filed December 16, 1926. Serial No. 155,191.

The present invention has for its main purpose a system for electrical distribution in which a transmission line, having a constant output feeds energy to a strongly fluctuating load in amount directly proportional to the need, and in which the same line feeds energy to another load, in amount inversely proportional to that fed to the first load.

In electrically operating rolling mills, hoisting apparatus, and the like, the load taken from the line is of an extremely variable character. A curve representing such a load in which the energy, expressed in kilowatts, plotted as ordinates and the time as abscissæ, is of very jagged character, having high, sharp "peaks" and deep, sharp "valleys".

There are difficulties in handling such loads. Unless some kind of an equalizing system is used the generator and other parts of the electrical equipment must be designed to carry a load greatly in excess of the average load, only a fraction of the total output capacity, however, being used.

Numerous attempts have been made to devise systems in which the total output capacity is closer to the actual output by employing some kind of a load equalizer. In most of these equalizers the energy is fed into an auxiliary load during the "valley" periods and from which it is fed back into the line, or to the work, during the "peak" intervals. Usually these auxiliary load means include an energy storing element as, for example, heavy fly wheels or storage batteries.

Such systems are usually complicated and are only partially successful. For one thing, it is difficult to obtain complete synchronism between the feed back and the load or work. Then too, it is only to a very limited extent that the energy can be stored in the auxiliary load means and still be instantly available for a constant and heavy demand in the work.

In my invention the electrical equipment is of sufficient capacity directly to take care of the peak load without depending upon any stored energy. But to utilize the full capacity of the equipment during the "valley" periods of the main load, energy is fed during such periods to an auxiliary or subordinate load.

My invention consists essentially of a main or dominant load of fluctuating character, in direct operative connection with a transmission line and a subordinate load so connected to the line that it draws energy therefrom inversely proportional to that being taken by the dominant load.

In the accompanying drawings I diagrammatically represent two embodiments of this idea.

Fig. 1 is a diagram of the connections in an arrangement wherein the changes in the main load cause variations in the field of a generator furnishing current to the subordinate load.

Fig. 2 is a diagram of an arrangement wherein the variations of the main load cause alterations in the subordinate load by means of an induction voltage regulator.

Fig. 3 is a diagram of the coil arrangement of the induction voltage regulator.

Referring to the embodiment shown in Fig. 1, the line L furnishes energy to the two loads A and B. Load A comprises electric motors and rolling mills actuated thereby, operatively connected in the usual manner. Load B comprises motor C actuating the generator G operatively connected to the work K which, in this embodiment, is shown as an electric furnace. The field F is adapted to receive a direct current from a suitable source V. The secondaries of the current transformers D are operatively connected to the torque motor E which is adapted to act against the spring H. Arm P mounted on the shaft of the torque motor and adapted to turn therewith, conductively engages the contact points of resistance R, one end of this resistance being connected to lead "$m$" of the field exciting curent; lead "$n$" from one end of the field winding is conductively connected to arm P. Thus the field exciting current is adapted to pass through a greater or lesser amount of the resistance R, depending upon the position of arm P.

When load A is at a maximum the current of the line and the voltage of the secondaries of the current transformers will also be at a maximum and the torque motor will be actuated to move its arm to include the total resistance R in the circuit of the current which excites the field of generator G. As a consequence, the field will be very weak and the current generated and fed to the electric furnace will be at a minimum.

When no work is bieng done at A the current of the line will be at a minimum, as will also be the voltage of the secondaries of the current transformers. The spring of the torque motor will be effective to turn it so that the arm moves to eliminate the entire resistance R in the field circuit. As is evident, this will result in a maximum amount of current being generated and fed to the electric furnace.

Obviously, for any particular amount of load on A, between zero and the maximum there will be an amount of energy fed to B approximately inversely proportional to that being taken by A.

Now, referring to the embodiment shown in Figs. 2 and 3, a current is fed from the line to the subordinate load $k$ through a transformer $t$, the current passing through the boost and buck induction voltage regulator $p$, the movable coils $c$ of which are actuated by the torque motor $e$, operated, as in the first embodiment described, by a current transformer $d$, the voltage of the secondaries of which varies directly with the value of the main or dominant load A. The moving and fixed coils of the induction voltage regulator are so related that when the load A is at a maximum the torque motor actuates the moving coils to a position such that the bucking effect of the coils is at a maximum and the amount of current fed to the subordinate load is at a minimum. When no energy is being taken by the main load A the spring of the torque motor actuates the movable coils to a position such that the boosting effect is at a maximum and a maximum amount of energy is fed to the subordinate load. Obviously, when amounts of energy intermediate between these are being taken by the main load, the energy fed to the subordinate load will vary inversely therewith, as in the embodiment first described.

While somewhat specific modes of the invention are shown and described it is obvious that there are many different ways in which the inventive concept can be embodied, and it is not intended to limit the protection sought on the invention in any way except by the statement of invention and by the claim.

What it is desired to emphasize as the broad inventive thought is of a dominent load which receives from a source, electrical energy directly proportional to the work demand, in combination with a subordinate load which receives energy inversely proportional to that being supplied to the dominant load.

What I claim is:

In combination with a transmission line, a dominent load of rapidly and strongly fluctuating character operatively connected to the line to receive energy therefrom in amount directly proportional to the work demand, a subordinate load operatively connected to the line so as to receive electrical energy through an induction voltage regulator, means responsive to variations in the dominent load to actuate the induction voltage regulator, whereby energy is fed to the subordinate load in amount inversely proportional to that fed to the dominant load.

In testimony whereof I hereunto affix my signature.

JOHN C. REED.